July 11, 1939.   J. A. TEMPLEMAN   2,165,423
EGG GRADING DEVICE
Filed Feb. 27, 1936
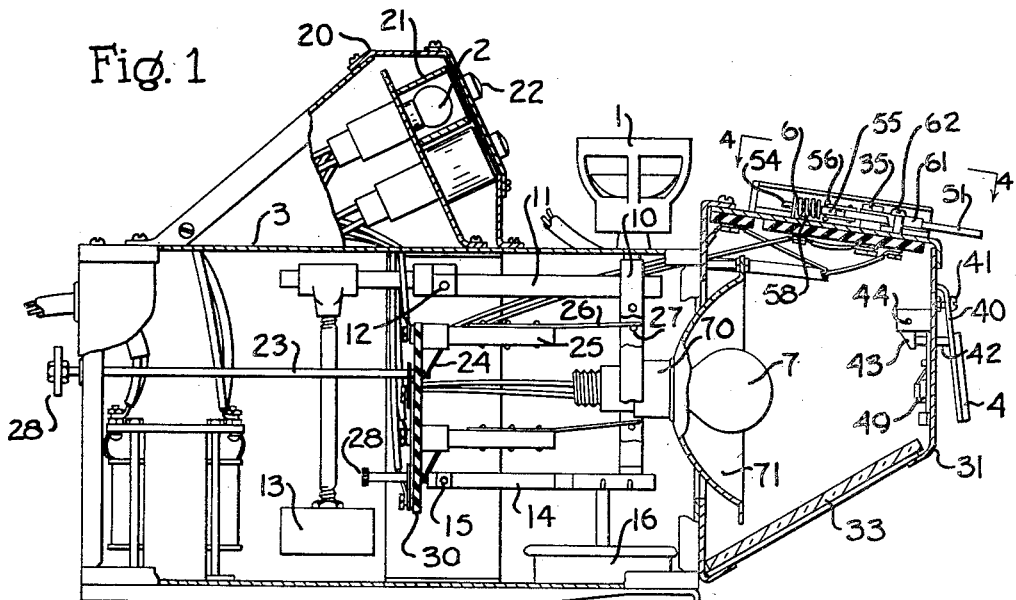
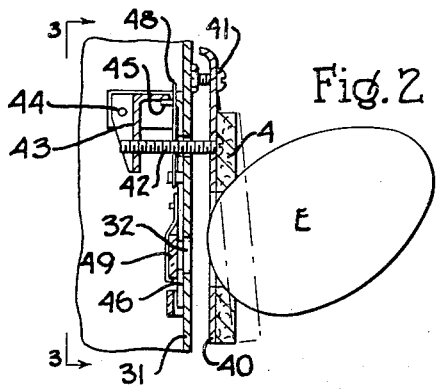
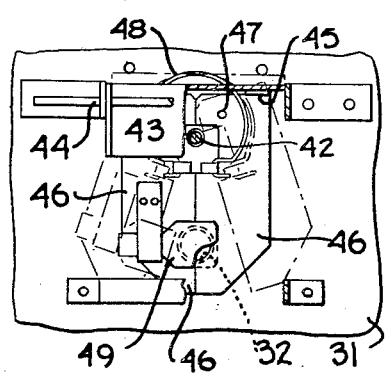
Inventor
James A. Templeman
By Charles L. Reynolds
Attorney Patented July 11, 1939

2,165,423

UNITED STATES PATENT OFFICE 2,165,423

EGG GRADING DEVICE

James A. Templeman, near Seattle, Wash., assignor to Grade-O-Lite, Inc., Seattle, Wash., a corporation of Washington Application February 27, 1936, Serial No. 66,132

7 Claims. (Cl. 88—14.92)

My invention relates to egg grading devices, intended for the commercial grading of eggs. Grading, as herein used, includes grading by weight, grading by candling to determine the interior condition of the egg, and grading the exterior condition of the egg.

In such operations the candling must be carried on in a dark room, for the candler must have a strong light emitted through a small aperture which can be substantially closed by positioning an egg in front of it, whereby, by light transmitted through the egg, she can observe the conditions within the egg. Any source of light within in the room is a distraction and a strain upon the candler's eyes. Nevertheless the candler must at times be able to see the case from which she is lifting eggs or those into which she is putting them. For such reasons, and because the candler must at the same time observe the exterior condition and color of the egg, it is essential that there be a constant but subdued light, of suitable color characteristics, upon the eggs, a number of which are usually placed immediately below the light aperture preparatory to candling them. In other words, the candler must have a certain amount of light to see what she is doing from time to time, and for one of the grading operations, but this light must be so arranged and controlled that it does not affect the candler nor produce any strain upon her eyes by reason of marked changes of brilliance, nor must it similarly affect adjacent workers. Working in a dark room, the candler must nevertheless be able to determine the weight of eggs, coincidentally with and without delaying the candling operation, or otherwise the eggs must be handled again.

It is, therefore, a primary object of this invention to provide a device by the use of which all the grading operations may be carried out, in an expeditious manner, and under conditions necessary to the candling operation. It is, furthermore, an object to provide such a device with the several parts, controls and indicators so arranged, relative to one another, that the candler is operating under the most favorable conditions, with no diversion of her attention, and the average candler is enabled, by freedom from eye or muscular fatigue, by convenience of arrangement of the several parts, and by avoidance of the necessity of waiting for completion of any one operation, to grade a considerably larger number of eggs in an hour, or a day, than heretofore, thereby reducing the cost of candling and saving through more accurate grading.

It is a further object of my invention to provide means whereby the egg cases and the eggs about to be candled can be illuminated at will, but in such a way that a minimum amount of light is emitted, and this only in controlled amounts, so directed that the candler's eyes and those of her neighboring candlers are not affected.

It is preferred to candle eggs with concentrated colorless or "white" light. Because it produces a minimum of eye fatigue, and because it enables better observation of the egg interior, better identification of certain defects within an egg, and better distinguishment between what appear under white light to be defects and the actual defects, green light has been used in candling, as explained in the Egg and Poultry Market Review of the Canadian Department of Agriculture, April 27, 1934 (published also in the U. S. Egg and Poultry Magazine, June, 1934 issue). For example, under white light the shape of the yolk is insufficiently clearly defined to identify flattened or addled yolks in every case, but since green light contains little of the colors in the yolks, the diffusion of light by reflection therefrom is cut down to such an extent, by green light, that the shape of the yolk is quite sharply defined, and flattened or addled yolks may be discovered. Again, certain eggs have an apparent pink tint under white light, which is often misinterpreted as indicating blood spots. This pink tint may, however, be due to peculiar but harmless characteristics of the shell or lining, yet an egg having a blood spot must be graded down. By the use of green light the blood spot, though tiny, may be actually seen, whereas it may not under white light. Again, white rot is not readily discoverable with white light, nor grass rot with green light. It is, therefore, an object of this invention to enable the egg interior to be illuminated by white light or by a colored (usually green) light, at will, and without substantial change in its position or delay in handling the egg, thus in what is in effect one operation disclosing completely the condition of the interior of the egg.

Because it is necessary for candlers to handle many thousands of eggs during a day (8000 to 16000 in an eight-hour day), since the unit price of eggs is low, and but little time can be spent in grading operations, it is necessary that all agencies having to do with the grading of eggs shall be conveniently located so that a minimum of time and effort is required to accomplish the grading operations, upon each egg, and therefore it is a further object so to locate all parts of the grading device that the grading is facilitated and the time required for each egg may be reduced to the minimum.

Because, as noted above, all operations are carried out in a dark room, yet it is necessary to grade the eggs by weight, it is a further object to provide a grading device wherein the weight of the egg is indicated by a light code. For example, failure to light any light may indicate a minimum weight, one light a light egg, two lights an intermediate, and three lights a heavy grade. Further, it is an object to produce such a system wherein the lights are differently colored, so that there can be no mistake as to the weight of the egg being weighed, the weight being indicated both by the number and color of lights illuminated.

With these and other objects in mind, as will appear hereafter, my invention comprises the novel parts, and the novel combination and relative arrangement thereof, as shown in the accompanying drawing, described in this specification, and as will be more particularly defined by the claims which terminate the same, and it will be understood that various changes may be made in the form, character and arrangement of the elements without departing from the scope of my invention as therein defined.

In the accompanying drawing I have shown my invention in a form which at present is preferred by me.

Figure 1 is in general a side elevation, with the near side omitted, to show parts in longitudinal vertical section, illustrating my complete grading device.

Figure 2 is an enlarged sectional view through the candling aperture and the mechanism associated therewith for altering the color the light, and Figure 3 is an elevation thereof, with parts broken away, taken from the viewpoint indicated by the line 3—3 of Figure 2.

Figure 4 is an elevation of a control switch for the external lights, taken from the viewpoint indicated by the line 4—4 of Figure 1.

In general my invention comprises scale mechanism whereon an egg may be weighed, indicating means controlled by the scale mechanism to indicate the weight of the egg, a candling light and aperture, with means to alter the color of light emitted through such aperture, and external lights for illuminating the cases at one or the other side of the candler, with switch mechanism to control the illumination of these external lights, and the whole arranged for convenient and expeditious operation by the candler, and in a dark room, so that the candler requires but slight movement to complete the operations of grading the exterior, weighing, and candling an egg, and may therefore handle a large number of eggs in an hour. It will thus be seen that my invention comprises the general grouping and arrangement of these various elements, whatever may be their specific form, and the specific form of certain of these elements is in itself new.

The scale mechanism, the details of which may vary, comprises a bifurcated vertical frame 10, terminating at its upper end in a basket or scale pan 1, this frame being pivotally carried upon a scale beam 11, balanced at 12 within a casing 3, and carrying a weight 13 which is initially adjusted along the beam 11. To hold the frame 10 upright its lower end is pivotally connected to an arm 14, hingedly mounted at 15, so that it is maintained substantially parallel to the beam 11, thus holding the frame 10 upright. A dashpot 16 should be employed to damp any tendency of the scale beam to oscillate, and so that it will instantly come to rest in any position, and thus will indicate the weight of an egg in the scale pan 1, without any delay. This is important, as the egg is first candled, and if its weight can not be instantly determined, it must be left on the scale pan until the latter comes to rest, while other eggs are candled, with the result that its interior condition is forgotten, and it must be candled again.

The indicating means are preferably electric lights, and several such lights should be employed. If four are used, one will indicate "peewee" eggs, the second will indicate "small" eggs, the third "medium" eggs, and the fourth "large" eggs. There may, of course, be fewer or a greater number of lights, or they may be so controlled to indicate other weights than those given. Such lights are conveniently mounted in a hood 20 forming part of or supported upon the top of the main casing 3. The lamps, indicated by the lamp 2, are enclosed within the hood 20, and preferably each is surrounded by a light guard 21, so that each light may shine through its aperture 22, the several apertures being preferably differently colored.

To illuminate these lamps they are connected to switches controlled by the scale beam. Thus, for example, each of these lamps is connected to one of four adjustable contacts 23 (two pairs of which are in line in Figure 1), supported in an insulating member 30 within the casing, the complemental contact 24 being carried by a pivoted arm 25, so that with no weight in the scale pan the contact points 23 and 24 are not in contact. The arm 25 carries a light spring extension 26, which extension rests upon a pin 27 carried by the frame 10. As the frame 10 is moved downwardly by the weight of an egg it reaches a point where the contact 24 comes into contact with the adjustable contact 23, whereupon the extension 26 is lifted from the pin 27. This point would correspond to the depression of the scale pan by an egg of a given weight, and by arranging the several contacts to be closed at different points in the downward movement of the frame 10 and scale pan 1 the weight of each egg when placed on the scale pan can be accurately and immediately determined. Each such set of contacts is connected to its individual lamp 2, these lamps being illuminated in succession, first one, then an additional one, then the third one, and then the fourth one, so that finally, for "large" eggs, all the lamps are illuminated. If these lamps 2 (or their lenses 22) be made of different color, they will indicate, for example, by a red light a "peewee" egg, by the red and green lights a "small" egg, by the white, red and green lights a "large" egg, and by white, red, green and amber lights a "jumbo" egg. By providing a handle 28 on each contact 23, within or without the casing, the weight for which the scale is set can be nicely and accurately adjusted.

It is important that the arm 25 have sufficient weight to make good contact between the contacts 23 and 24. However, this weight is in itself a disadvantage. Near a balance point, that is, when the contacts 23 and 24 are about in contact, the weight of the arm 25, if applied to the frame 10, would be that much added weight. If the contacts just come together at such a point, tending to remove from the frame 10 and scale pan 1, all at once, the entire added weight of the arm 25, the scale pan would then tend to rise and to break such contact. This would cause the corresponding lamp to flicker on and off, perhaps several times, and this flickering is extremely objectionable, first, because it leaves the operator in doubt as to the exact weight of the egg, and second, that the flickering on and off disturbs her eyes. It is therefore essential that the scale beam be not permitted to rise and fall, yet there must be sufficient weight in the arm 25 to make good contact between 23 and 24.

It is for this reason that the flexible extension 26 is used. This extension, resting on the pin 27, flexes somewhat from the weight of the arm 25. When the scale pan has dropped sufficiently to bring any set of contacts 24 and 23 into contact, the extension 26 does not immediately cease pressing on the pin 27, but as the scale pan drops lower the extension 26 relaxes its flexure gradually, until it stands without flexure above the pin 27, but the relief of the weight of the arm 25 on the pin 27 is gradual, occurs after closure of the contacts 23 and 24, and therefore causes no flickering, particularly as the dashpot 16 operates to damp any slight tendency to move. In rising, there is no abruptly added weight, as the frame 10 picks up each arm 25, for the first action in rising is that the pin 27 engages the extension 26 and flexes it somewhat, thus gradually picking up the weight of the arm 25 until the weight has been completely picked up and contact broken between 24 and 23.

One reason for bifurcating the frame 10 is to permit a lamp 7 to be placed as closely to the scale pan as possible, and in line therewith though somewhat below it. The lamp socket 70 may thus be placed between the sides of the bifurcated frame 10, as illustrated in Figure 1. The lamp 7 is enclosed within a housing 31 projecting forwardly from the main casing 3, and in the front of this housing 31 is formed a candling aperture 32. Light from the lamp 7 shines through the aperture 32, and preferably this light is concentrated by a reflector 71 to throw the strongest possible light through the aperture. This concentrates considerable heat at the aperture, and a certain spacing between the lamp and aperture is necessary, but by bifurcating the frame 10 and bringing the lamp socket closely beneath the scale pan, this distance, through which the candler must move an egg between the operations of candling and weighing, is cut down to a minimum.

It is desirable to provide means whereby an egg may be quickly and accurately located with respect to the candling aperture 32, without danger of its being broken. For this purpose, and in order to provide convenient means for changing the color of the light emitted through the aperture, I provide a collar 4 of relatively soft or cushioning material, for example, leather, located around the aperture 32 and in front thereof. If it were employed only for locating and cushioning the egg it might be fixed in position, but in order to control the color change it is formed as part of an arm 40 which is hingedly mounted, as for example on the studs 41 projecting forwardly from the housing 31, and this arm carries a further stud 42, projecting through an aperture in the front of the housing 31, to engage one arm of a bell crank lever 43, pivoted at 44 within the housing. The other arm of this lever 43 engages an arm or lug 45 upon each of the two shutter arms 46 (although one alone would suffice), pivoted at 47, and normally held aside from the aperture 32 by means of a spring 48. One of these arms carries a translucent colored screen 49, which may be green glass, so disposed that when the arms 46 are swung together the screen 49 will lie between the aperture 32 and the lamp 7. The arms 46 may be provided with complemental notches, as seen in Figure 3, registering with but somewhat smaller than the aperture 32, when swung together. The use of a smaller aperture in itself reduces the amount of light emitted, and assists in better defining conditions within the egg, whether or not a colored glass screen be employed.

The spring 48 normally holds the arms 46 swung outwardly in the dot-dash position of Figure 3, and the arm 40 similarly swung outwardly from the face of the housing 31 in the dot-dash position of Figure 2. An egg E is shown in candling position against the face of the cushion 4, which may be beveled to form a seat for it, and so long as the arm 40 is not pushed inwardly, white or colorless light is emitted through the aperture 32 for candling in the usual manner. By merely pressing inward slightly with the egg, the arm 40 is swung inwardly, swinging the arms 46 inwardly and interposing the green screen 49 in the light aperture, so that the light shining through the egg is now of a greenish color, the total amount of light is reduced, and conditions within the egg are more clearly defined.

The candler ordinarily has, supported below and conveniently to the aperture 32, a number of eggs to be candled. In order that she may see these eggs without fumbling in the dark, and observe their outward condition, the bottom of the housing 31 may be made translucent, and to cut down the intensity of the light and to show the eggs in their true condition, a screen 33 may be employed. This is preferably a daylight blue glass, and surface ground, so that the light passing through it from the lamp 7 is diffused and directed downwardly on the eggs beneath, and since most of the light of the lamp 7 is concentrated and directed through the aperture 32, the light shining through the ground blue glass 33 is not sufficiently strong to affect the candler nor nearby workers, and it is, moreover, directed downwardly out of the line of vision of the candler. By its color the candler can instantly detect color variations, dirt, or other exterior blemishes.

The candler has cases at each side of her, and occasionally must see into these cases so that she may know how full the cases are, and to place the eggs therein, or to count the number of eggs of a given grade, without fumbling in the dark. To assist her in such operations I provide, in addition to the lamp 7, two external lamps 5 and 50, connected in circuit with the lamp 7, but controlled by switch mechanism located conveniently for the candler, so that they may be turned on only as needed. These lamps may be screened with blue ground glass so that their light is not sufficiently strong or concentrated to affect the candler nor others nearby.

A convenient switch mechanism for the purpose is shown in Figure 4. It comprises an arm 51 pivoted upon the top of the housing 31 at 35, and having at its inner end two notches 52 and 53. A pin 54 is held in the end of a block 55, carrying pins 56 and 57 engaging in the respective notches 52 and 53. A compression spring 58 is interposed between the block 55 and a contact collar 59, carried on the pin 54. This contact collar 59, in the normal position of the switch arm 51, bridges two spaced contacts 6 and 60 included in the circuit of the lamp 7, and while in this normal position the lamp 7 is illuminated. Upon throwing the switch arm 51 to the left in the dot-dash position of Figure 4 the collar 59 breaks contact with the contact 6, and retains contact with the contact 60. The pivot 35 of the arm 51 is in the main circuit, and is electrically connected to a sleeve 61 on the arm 51. Upon swinging this to the left, then, the spring 58 tends to force the arm to an extreme position, where it contacts with a live stop 62, which is in circuit with the lamp 50. Upon swinging it to the opposite side it brings up against a similar stop 63 in circuit with the lamp 5. Thus upon swinging the switch arm to one side or the other of its normal position the circuit of the lamp 7 is broken by raising of the collar 59 from one or the other of the contacts 6 or 60, and the circuit is established through the pivot 35 and the stop pin 62 or 63 with the lamp 50 or 5 respectively, and thus the operator has conveniently located for control a means of illuminating the case at her left or at her right, or the eggs immediately in front of her, as she may desire, yet never is more than one such lamp illuminated; therefore the total illumination is not sufficiently strong to affect the candler's eyes nor the eyes of nearby workers.

It will be observed that the candling aperture 32, and of course the collar 4 surrounding it, the switch arm 51, the scale pan 1, and the lamps 2 are all located close together and in line with each other, as is also the screen 33, illuminating the eggs to be candled. These eggs are placed beneath the housing 31, and the candler has only to pick up one of these eggs, present it to the collar 4, press this collar inwardly, and then carry the egg in a straight line over to the scale pan 1, let it come to rest for an instant, read the weight of the egg, and lift it off the scale pan. She may conveniently perform all such operations by each hand, working alternately. If she desires to look into one or the other of her cases, she proceeds as before, and on the way from the candling operation to the weighing operation she may throw the switch arm 51 to one side or the other, thus illuminating one of her side lamps, and immediately the weighing of this egg is completed she may look into her case and observe the eggs therein. The whole operation, grading the exterior, candling and weighing, together with the throwing of the switch, may be accomplished in one straight-line motion, and with parts so closely located that there is no lost motion nor lost time, and in consequence it has been found that with the use of this device a considerably greater number of eggs may be completely graded in a given period of time, and more accurately, than with prior devices, and with much less strain and fatigue.

What I claim as my invention is:

1. An egg candling device comprising a casing having an aperture, a lamp within said casing, emitting light through the aperture, to illuminate an egg placed in front thereof, a translucent colored screen mounted on the casing for movement from a normal position, clear of the aperture, to an operative position, covering the aperture, a ring mounted on the casing, and movable with respect to the casing, said ring being formed and positioned to dispose an egg in candling position with respect to the aperture, and means operatively connecting said ring with said screen, to move the latter from its normal position to its operative position by movement of the ring while engaged by an egg.

2. An egg candling device comprising a casing having an aperture in its front wall, a lamp within said casing emitting light through said aperture, to illuminate an egg placed in front thereof, a translucent colored screen pivotally mounted on said front wall to swing, substantially in the plane of such wall, from a normal position, clear of the aperture, to an operative position, covering the aperture, a ring mounted outside of and on the front wall, surrounding the aperture, for swinging movement towards and from such wall, said ring being formed and disposed to position an egg in candling position with respect to the aperture, and means operatively connecting the ring and screen, to move the latter into operative position by pressure of an egg, in candling engagement with the ring, to move the latter towards the front wall, thereby to enable candling by direct light or by transmitted colored light.

3. An egg candling device comprising a casing having an aperture in its front wall, a lamp within said casing emitting light through said aperture, to illuminate an egg placed in front thereof, a translucent colored screen, a lever pivotally supported on and inside of said front wall, adjacent the aperture, whereon the screen is carried, spring means normally holding the lever and screen retracted from the aperture, the screen being movable, by movement of the lever, into operative position across the aperture, a ring pivotally mounted outside of and on the front wall, surrounding the aperture, for swinging movement towards and from such front wall, said ring being formed and disposed to position an egg, in contact therewith, in candling position in front of the aperture, means carried by the ring, and extending through the front wall, to engage said lever, whereby upon pressure of the ring towards the wall said lever and screen are swung from their normal position to the operative position.

4. An egg candling device comprising a casing having an aperture, a lamp within said casing emitting light through said aperture to illuminate an egg placed in front thereof, a member mounted on the casing and formed to engage and position an egg, said member being guided on the casing for movement between two positions, in each of which the egg is in candling position, stop means terminating the movement of said member in each such position, a translucent colored screen mounted upon the casing for movement between two positions, in one such position being interposed between the lamp and an egg which engages said positioning member, to modify the light transmitted through the egg, and in the other such position being clear of the candling light beam, and means operatively connecting said member and said screen, to move the latter into one position by movement of the member into one of its positions, and to move the screen into its other position by movement of the member to its other position.

5. An egg candling device comprising means to generate and define a beam of light, a translucent, light-modifying screen and means supporting the same for movement between two positions, in one of which it is clear of the light beam, and in the other of which it is interposed in such beam, to modify the same, a member disposed in line with the light beam, but on the opposite side of the screen from the light source, and engageable by an egg, thereby to position the egg in the light beam, and movable, while an egg is thus engaged with and positioned by it in the light beam, between two positions, and means operatively connecting said member and the screen for movement of the latter into light-modifying position by movement of the member into one of its positions, and for movement of the screen into clear position by movement of the member into the other of its positions.

6. An egg candling device comprising a lamp, a casing enclosing said lamp and apertured for emission of a beam of light, a member formed to position an egg which is engaged with it, and mounted upon the casing, adjacent such aperture, for limited movement towards and from the casing, and along the light beam, between two positions, spring means urging said member away from the casing, a translucent screen of a character to modify transmitted light, mounted upon the casing for movement between two positions, in one such position being clear of the aperture, and in the other such position being disposed transversely of the light beam, between the lamp and the egg-positioning member, and means operatively connecting the egg-positioning member and the screen, to hold the screen, under the influence of the spring means, in position clear of the light beam, and to move the screen, by pressure of an egg upon the egg-positioning member and along the light beam towards the aperture, into its other position, wherein the screen is interposed between the lamp and the egg so positioned, to modify the illumination of the egg.

7. An egg candling device comprising a casing having an aperture, a lamp within said casing emitting a light beam through said aperture, a single means disposed externally of the casing, closely adjacent the aperture, to position an egg in the emitted light beam for candling, a translucent screen supported from the casing independently of the positioning means, for movement between two positions, in one such position being clear of the light beam, and in the other such position being interposed in the light beam between the lamp and an egg engaged with said positioning means, to modify the light which illuminates the egg, and means operable by and in accordance with movement of the egg, but without removal of the egg from candling position, relative to the light beam, to effect movement of the screen between its two positions.

JAMES A. TEMPLEMAN.